(12) United States Patent
Bernard et al.

(10) Patent No.: US 7,391,972 B2
(45) Date of Patent: Jun. 24, 2008

(54) METHOD AND APPARATUS FOR MAINTAINING BEHAVIOR OF A NETWORK TERMINAL

(75) Inventors: Marc R. Bernard, Vienna, VA (US); Alexander S. Millard, Naperville, IL (US); Subbarao Nalajala, Naperville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

(21) Appl. No.: 11/265,492

(22) Filed: Nov. 1, 2005

(65) Prior Publication Data

US 2007/0098406 A1 May 3, 2007

(51) Int. Cl.
*H04B 10/20* (2006.01)
*H04J 14/00* (2006.01)

(52) U.S. Cl. .............................. 398/63; 398/67; 398/68

(58) Field of Classification Search ................... 398/63, 398/66–72

See application file for complete search history.

(56) References Cited

U.S. PATENT DOCUMENTS

| 2002/0114028 A1* | 8/2002 | Eijk et al. | 359/110 |
| 2004/0202174 A1* | 10/2004 | Kim et al. | 370/395.1 |
| 2006/0093356 A1* | 5/2006 | Vereen et al. | 398/33 |

* cited by examiner

*Primary Examiner*—Dalzid Singh
(74) *Attorney, Agent, or Firm*—Hamilton, Brook, Smith & Reynolds, P.C.

(57) ABSTRACT

A method of controlling behavior of an element in a passive optical network (PON) is provided. The method includes (i) issuing a message from a first PON element to a second PON element to cause the second PON element to enter or maintain a state of upstream communications, the state of upstream communications having an enabled state or a disabled state, (ii) ranging the second PON element by the first PON element if the state of upstream communications of the second PON element is in the enabled state, and (iii) bypassing the ranging of the second PON element if the state of upstream communications of the second PON element is in the disabled state.

28 Claims, 5 Drawing Sheets

METHOD AND APPARATUS FOR MAINTAINING BEHAVIOR OF A NETWORK TERMINAL

RELATED APPLICATIONS

This application claims the benefit of U.S. Provisional Application entitled "Method and Apparatus for Maintaining Behavior of a Network Terminal," filed on Oct. 3, 2005. This application is also related to U.S. Provisional Application No. 60/623,423 filed Oct. 28, 2004, entitled "Rogue ONT," which was incorporated in its entirety in Appendix A of the aforementioned Provisional Application. The entire teachings of the above applications are incorporated herein by reference.

BACKGROUND OF THE INVENTION

In a communications network, direction of communications are typically described as being either upstream or downstream relative to a fixed point in the communications network. For example, communications toward a central office from a subscriber terminal is described as upstream communications, while communications away from the central office toward the subscriber terminal is described as downstream communications. In a communications network, there are often more than one subscriber terminal communicating upstream. An aberrant situation arises if the upstream communications of one subscriber terminal interferes with the upstream communications of another subscriber terminal. In a large communications network, one having many subscriber terminals communicating upstream, it can be difficult to determine which subscriber terminal is causing the aberrant situation.

SUMMARY OF THE INVENTION

A method of controlling behavior of an element in a passive optical network (PON) is provided. The method includes (i) issuing a message from a first PON element to a second PON element to cause the second PON element to enter or maintain a state of upstream communications, the state of upstream communications having an enabled state or a disabled state, (ii) ranging the second PON element by the first PON element if the state of upstream communications of the second PON element is in the enabled state, and (iii) bypassing the ranging of the second PON element if the state of upstream communications of the second PON element is in the disabled state.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
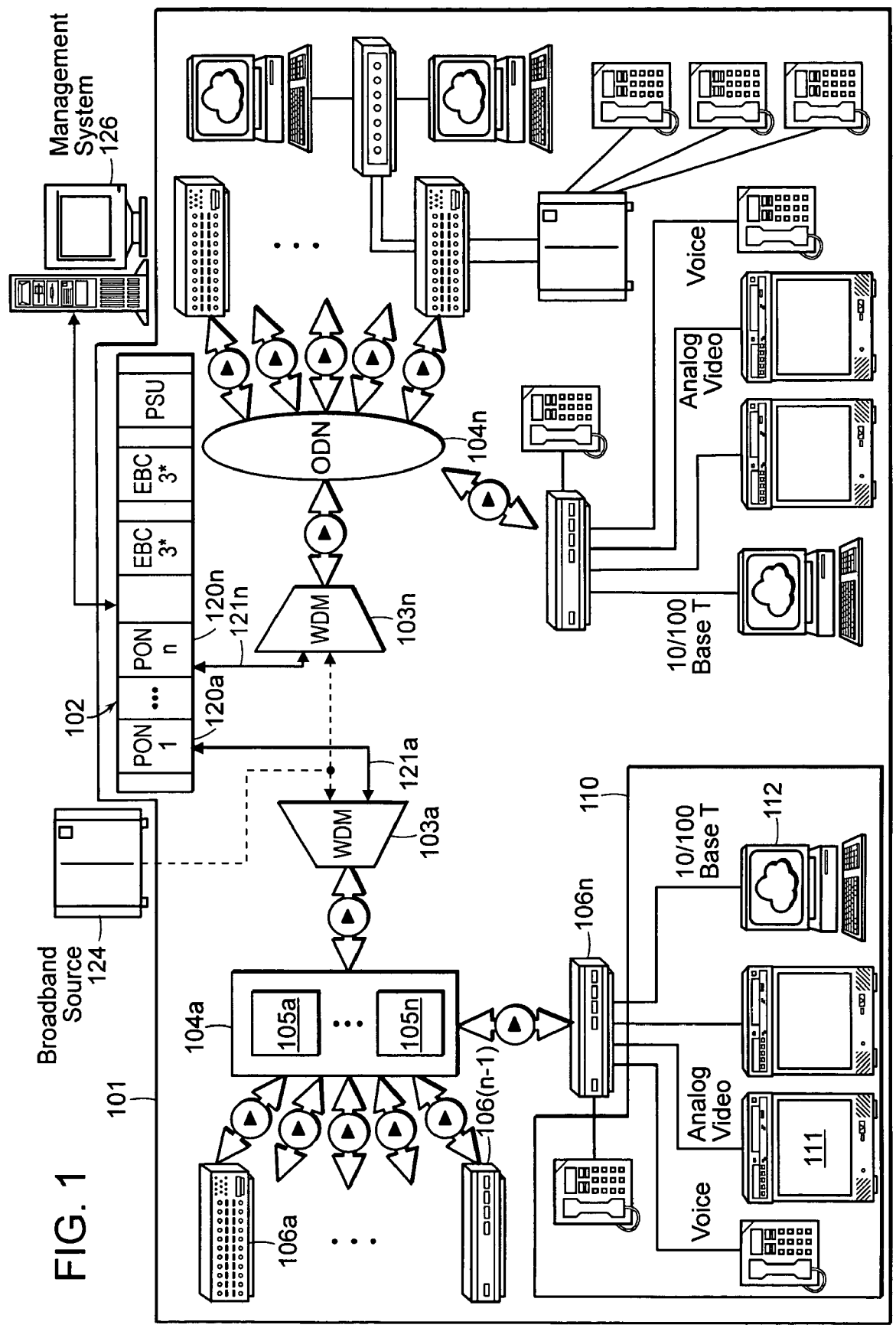
FIG. 1 is a network diagram of an exemplary network in which a Passive Optical Network (PON) card may cause an Optical Network Terminal (ONT) card to enter or maintain an Emergency Stop (E-STOP) state in accordance with one embodiment of the present invention.

A description of preferred embodiments of the invention follows.

Many Optical Line Terminations (OLTs) have an ability to provision Optical Network Terminals (ONTS) in an Emergency Stop (E-STOP) state. The E-STOP state is defined by Broadband Passive Optical Network (BPON) standards or Gigabit Passive Optical Network (GPON) standards as an upstream communications state having an enabled state or a disabled state. That is, upstream communications are enabled if the state of upstream communications is in the enabled state. Conversely, upstream communications are disabled if the state of upstream communications is in the disabled state. The standards further define a Passive Optical Network (PON) card sending a pre-defined Physical Layer Operation, Administration, and Management (PLOAM) message to specific ONTs telling these ONTs to enter into either an enabled or a disabled E-STOP state.

An E-STOP command is typically used in an event a rogue ONT arises in the field. Rogue ONTs are defined herein as ONTs that are misbehaving (e.g., transmitting at all times instead of during their Grant Window or transmitting at the same time as other ONTs and therefore interrupting the communications channels between the PON card and other ONTs).

One way to troubleshoot rogue ONTs is to send a disable message (e.g., Disable_serial_number PLOAM message), which causes the ONT with the serial number in the PLOAM message to stop transmitting upstream until told otherwise by the OLT or other supervisory network device. Additional information on the Disable_serial_number and Emergency Stop State behavior for ONTs can be found in ITU G.983.1.

The E-STOP command (ITU G.983.1) may cause all ONTs on a PON to be disabled and then individually enabled in order to manually isolate a rogue ONT. Emergency Stop conditions are essentially described by two commands or messages by which an ONT can be provisioned by a management system:

E-STOP-ON: The E-STOP-ON state tells the ONT to go into Emergency Stop state (i.e., a disabled upstream communications state). This function is performed by sending a Disable_serial_number PLOAM message. Per ITU G.983.1, E-STOP-ON occurs when the ONT receives a Disable_serial_number message with its own serial number and the enable flag=0xFF. It stays in this state even after powering off. During the disabled upstream communications state, the ONT does not transmit upstream communications but continue to receive and process downstream communications.

E-STOP-OFF: The E-STOP-OFF state tells the ONT to recover from an Emergency Stop state and communicate upstream with the OLT once again. This function is performed by sending a Disable_serial_number PLOAM message. Per ITU G.983.1, E-STOP-OFF occurs when the ONT receives a Disable_serial_number message with enable flag=0x0F or when it receives a Disable_serial_number message with its own serial number and the enable flag=0x00.

A service provider who is troubleshooting a problematic PON typically may isolate a bad ONT by provisioning different ONTs to be in an E-STOP state and removing these ONTs from the PON while still being in this E-STOP state. The general behavior for an ONT is to maintain the E-STOP state across reboots and at all times until the ONT has been told otherwise by the PON/OLT to come out from this E-STOP state.

A problem arises for example when the ONTs removed from the PON are added to inventory and then re-deployed on another PON. At this time, these ONTs are still in an E-STOP state and do not respond to any ranging grants (i.e., these ONTs cannot be ranged) or any messages from the OLT until it has been told to come out of the E-STOP state.

Another problem arises, for example, when the ONTs are plugged into the PON prior to being ranged. If an ONT is not behaving correctly (i.e., it is misbehaving), it can possibly transmit when the ONT is not supposed to, at which point the ONT interferes with upstream communications between the PON/OLT and other ONTs.

One embodiment of the present invention provides a mechanism which provisions ONTs in an E-STOP state even when they are not ranged, thereby allowing the service provider to perform additional troubleshooting.

As stated previously, ONTs are supposed to maintain the E-STOP state across reboots until they are told otherwise by the PON/OLT. There may be, for example, rogue ONTs that have a recurring rebooting condition whereby they do not maintain the E-STOP state across a reboot, possibly caused by a loss of non-volatile memory or entering a rebooting condition prior to storing the E-STOP state in non-volatile memory. When this occurs, it is possible for rogue ONTs to reboot and re-transmit on a PON even though they were initially provisioned not to do so. Accordingly, an embodiment of the present invention provides a mechanism for the PON/OLT to refresh the E-STOP state with those ONTs in case it is desired to do so.

In accordance with one embodiment of the present invention, an OLT/PON mechanism or behavior responds to the ONT being provisioned if it is in an E-STOP-ON state or if the ONT is not in an E-STOP state, also called an E-STOP-OFF state as defined previously.

An embodiment of the present invention may also ensure that the ONT remains in the E-STOP state at all times as long as a valid serial number is provisioned for the ONT. Thus, if the service provider, for example, provisions the ONT to be in the E-STOP state, it does not matter if an activation mode of the ONT is enabled or disabled or if the ONT is even present on the PON. In accordance with one embodiment of the present invention, the PON/OLT sends the applicable disable messages at all times.

To control the behavior of a second PON element in a PON, a first PON element (e.g., a card, circuit, chip on a circuit, software, subsystem, or system) may issue a message to the second PON element (e.g., a card, circuit, chip on a circuit, software, subsystem, or system) which causes the second PON element to enter or maintain a state of upstream communications having an enabled state and a disabled state. The first PON element, in addition to issuing the message, may range the second PON element while the state of upstream communications is in the enabled state or may bypass the ranging if the state of upstream communications is in the disabled state.

To detect one or more second PON elements which are disrupting the upstream communications of multiple second PON elements, the first PON element may cause at least one of the multiple second PON elements to enter into the disabled state of the state of upstream communications. The first PON element may cause at least one of the multiple second PON elements to enter into the enabled state of upstream communications.

Additionally, the first PON element may cause the multiple second PON elements to enter into the disabled state of upstream communications. The first PON element may cause at least one of the multiple second PON elements to enter into the enabled state of upstream communications.

In the case of the first PON element being a PON card and the second PON element being an ONT card, whether or not the PON card issues the message is determined, for example, by whether or not the ONT card is provisioned. That is, the PON card may issue, for example, the message when the ONT card is provisioned, but not when the ONT is not provisioned.

The PON card may issue the message to the ONT card more than once. For example, the PON card may issue the message each time the PON card ranges or attempts to range the ONT card. Furthermore, the PON card may, for example, issue the message to multiple ONT cards at once.

In some network embodiments, the message issued from the PON card to the ONT card may be a Physical Layer Operations, Administration and Maintenance (PLOAM) message.

In the event upstream communications are disrupted, the PON card may cause at least one ONT card to enter the disabled state of the state upstream of communications. In response to the disabled state, the ONT card may disable its transmitter. The state of upstream communications may be stored, for example, in a database in communication with the PON card.

FIG. 1 is a network diagram of an exemplary passive optical network (PON) 101. The PON 101 includes an optical line terminal (OLT) 102, wavelength division multiplexers 103*a*, . . . , 103*n*, optical distribution network (ODN) devices 104*a*, . . . , 104*n*, ODN device splitters (e.g., 105*a*, . . . , 105*n* associated with ODN device 104*a*), optical network terminals (ONTS) (e.g., 106*a*, 106*b*, . . . , 106*n* corresponding to ODN device splitters 105*a*, . . . , 105*n*), and customer premises equipment (e.g., 110). The OLT 102 includes PON cards 120*a*, . . . , 120*n*, each of which provides an optical feed (121*a*, . . . , 121*n*) to ODN devices 104*a*, . . . , 104*n*. Optical feed 121*a*, for example, is distributed through corresponding ODN device 104*a* by separate ODN device splitters 105*a*, . . . , 105*n* to respective ONTs 106*a*, 106*b*, . . . , 106*n* in order to provide communications to and from customer premises equipment 110. A PON card 120*a* may cause at least one ONT card (not shown) in an ONT 106*a*, 106*b*, . . . , 106*n* to enter or maintain an Emergency Stop (E-STOP) state.

The PON 101 may be deployed for fiber-to-the-business (FTTB), fiber-to-the-curb (FTTC), and fiber-to-the-home (FTTH) applications. The optical fibers 121*a*, . . . , 121*n* in PON 101 may operate at bandwidths such as 155 Mb/sec, 622 Mb/sec, 1.25 Gb/sec, and 2.5 Gb/sec or any other desired bandwidth implementations. The PON 101 may incorporate asynchronous transfer mode (ATM) communications, broadband services such as Ethernet access and video distribution, Ethernet point-to-multipoint topologies, and native communications of data and time division multiplex (TDM) formats. Customer premises equipment (e.g., 110) that can receive and provide communications in the PON 101 may include standard telephones (PSTN and cellular), Internet Protocol telephones, Ethernet units, video devices (e.g., 111), computer terminals (e.g., 112), digital subscriber line connections, cable modems, wireless access, as well as any other conventional device.

A PON 101 includes one or more different types of ONTs (e.g., 106a, 106b, ..., 106n). Each ONT 106a, 106b, ..., 106n, for example, communicates with an ODN device 104a through associated ODN device splitters 105a, ..., 105n. Each ODN device 104a, ..., 104n in turn communicates with an associated PON card 120a, ..., 120n through respective wavelength division multiplexers 103a, ..., 103n. Communications between the ODN devices 104a, ..., 104n and the OLT 102 occur over a downstream wavelength and an upstream wavelength. The downstream communications from the OLT 102 to the ODN devices 104a, ..., 104n may be provided at 622 megabytes per second, which is shared across all ONTs connected to the ODN devices 104a, ..., 104n. The upstream communications from the ODN devices 104a, ..., 104n to the PON cards 120a, ..., 120n may be provided at 155 megabytes per second, which is shared among all ONTs connected to ODN devices 104a, ..., 104n.

A broadband source 124, of which a cable television feed through an erbium doped fiber amplifier (EDFA) is just one example, may also provide video or other broadband data to the WDMs 103a, ..., 103n using a single wavelength (hereinafter, video wavelength). The WDMs 103a, ..., 103n multiplex the PON upstream and downstream communications wavelengths and the video wavelength and provide the resulting multiplexed signals to respective ODN devices 104a, ..., 104n. Each ONT (e.g., 106a, 106b, ..., 106n) may monitor a broadband overlay signal provided by broadband source 124. One example of a broadband overlay signal is a 1550 nanometer signal used for downstream video applications.

Figure 2A:
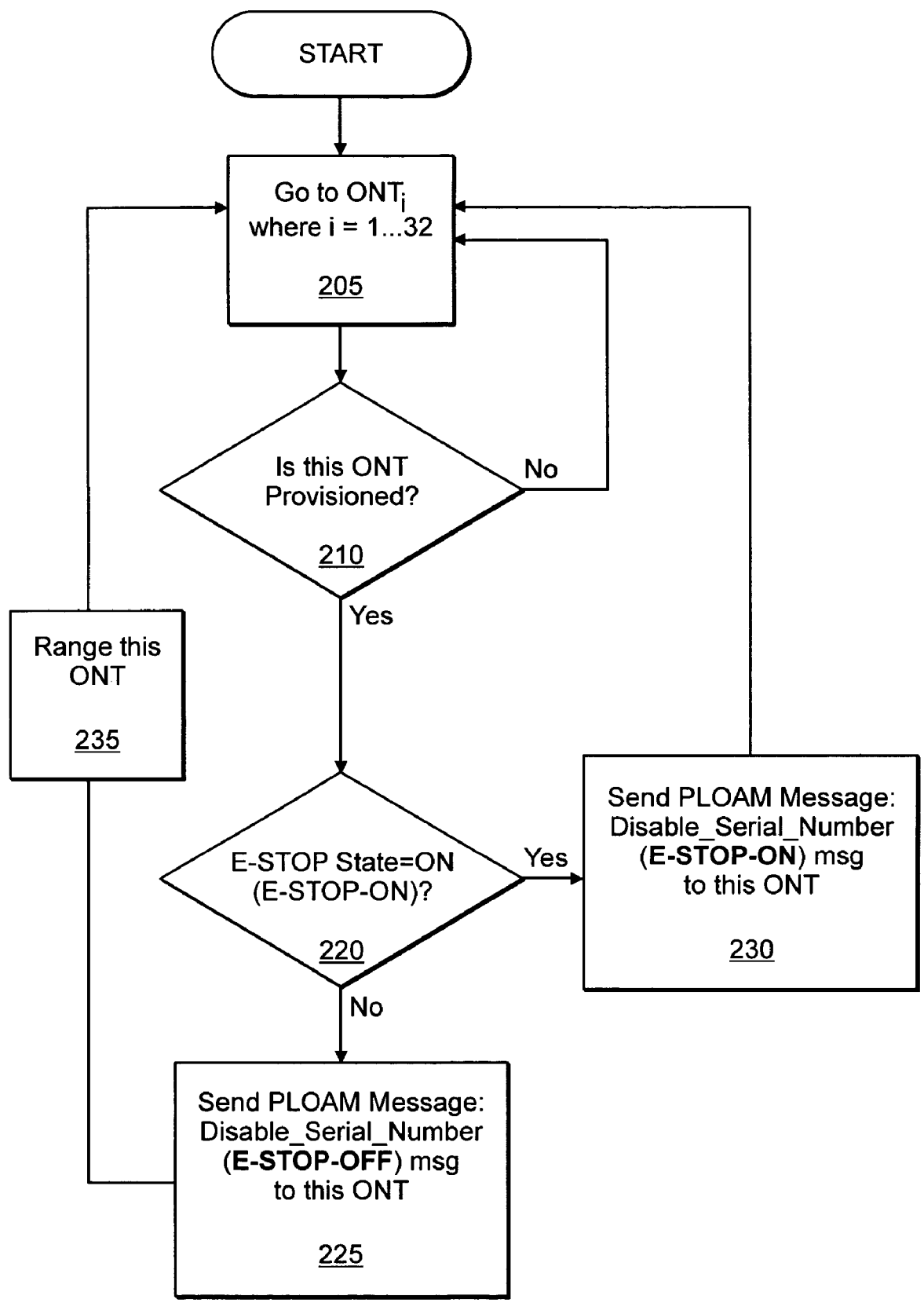
FIGS. 2A through 2C are flow charts of exemplary actions performed by a PON card in accordance with embodiments of the present invention.

FIG. 2A illustrates exemplary steps a PON card undertakes before attempting to range a provisioned ONT card.

At step 205, the PON card selects an ONT card to range, e.g., $ONT_1$.

Next, at step 210, the PON card determines whether the ONT card is provisioned. If the ONT card is not provisioned at step 210, the PON card returns to step 205 to range a next ONT card, e.g., $ONT_2$.

If the PON card determines the ONT card is provisioned at step 210, the PON card determines whether the E-STOP state of the ONT card is set to E-STOP-ON at step 220.

If the E-STOP state of the ONT card is not set to E-STOP-ON at step 220 (i.e., the E-STOP state of the ONT is set to E-STOP-OFF), the PON card sends at least one disable (e.g., Disable_serial_number PLOAM) message with an E-STOP-OFF indication to the ONT card at step 225. Additionally, the PON card may attempt to range the ONT per existing behavior at step 235.

If, however, the E-STOP state of the ONT card is set to E-STOP-ON at step 220, the PON cards sends at least one disable message with an E-STOP-ON indication to the ONT card at step 230.

In either case, the PON card may return to step 205 to range a next ONT card, e.g., $ONT_2$.

It should be readily appreciated by those of ordinary skill in the art that the aforementioned steps are merely exemplary and that the present invention is in no way limited to the number of steps or the ordering of steps described above.

For example, the PON card can also send a Disable_serial_number message associated with a E-STOP state regardless of an ONT Activation Mode (i.e., enabled or disabled) as long as a valid serial number is provisioned for the ONT card. Accordingly, this ensures the ONT card will receive the appropriate Disable_serial_number message at all times.

Figure 2B:
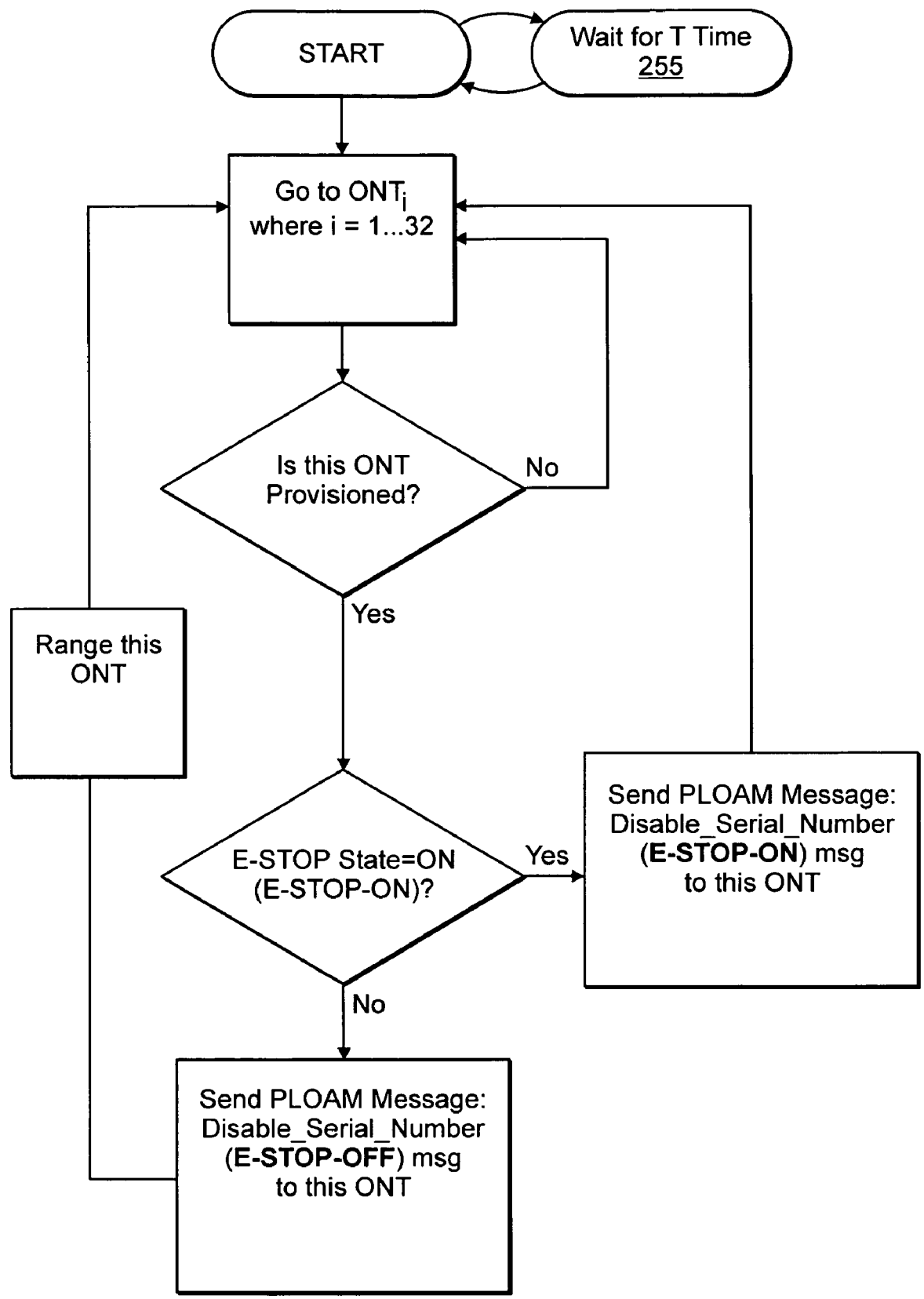

Referring to FIG. 2B, in yet another example, rather than sending a Disable_serial_number message when a PON card is about to attempt to range an ONT card, the PON card periodically sends the Disable_serial_number message per a time interval at step 255. The time interval preferably being a programmable parameter known to the PON card.

In still another example, an E-STOP state is treated as a provisioned state on a PON card and is therefore maintained in a database of an OLT. Accordingly, this enables the OLT to maintain an E-STOP state of an ONT card across reboots, upgrades, etc.

Figure 2C:
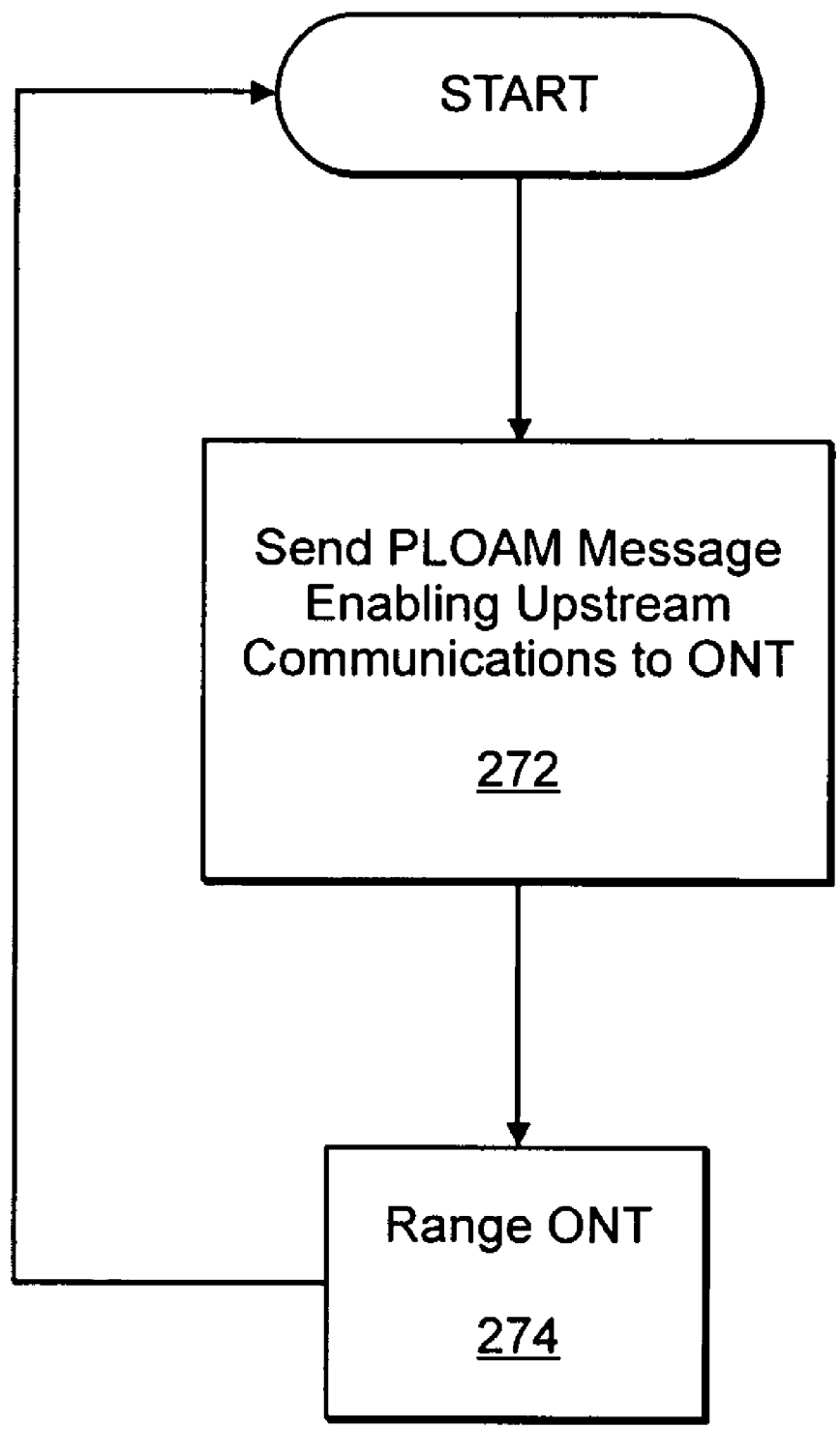

Referring to FIG. 2C, in another embodiment of the present invention, the PON card sends a PLOAM message to an ONT to enable upstream communications at step 272. Then, at step 274, the PON card ranges the ONT.

Figure 3:
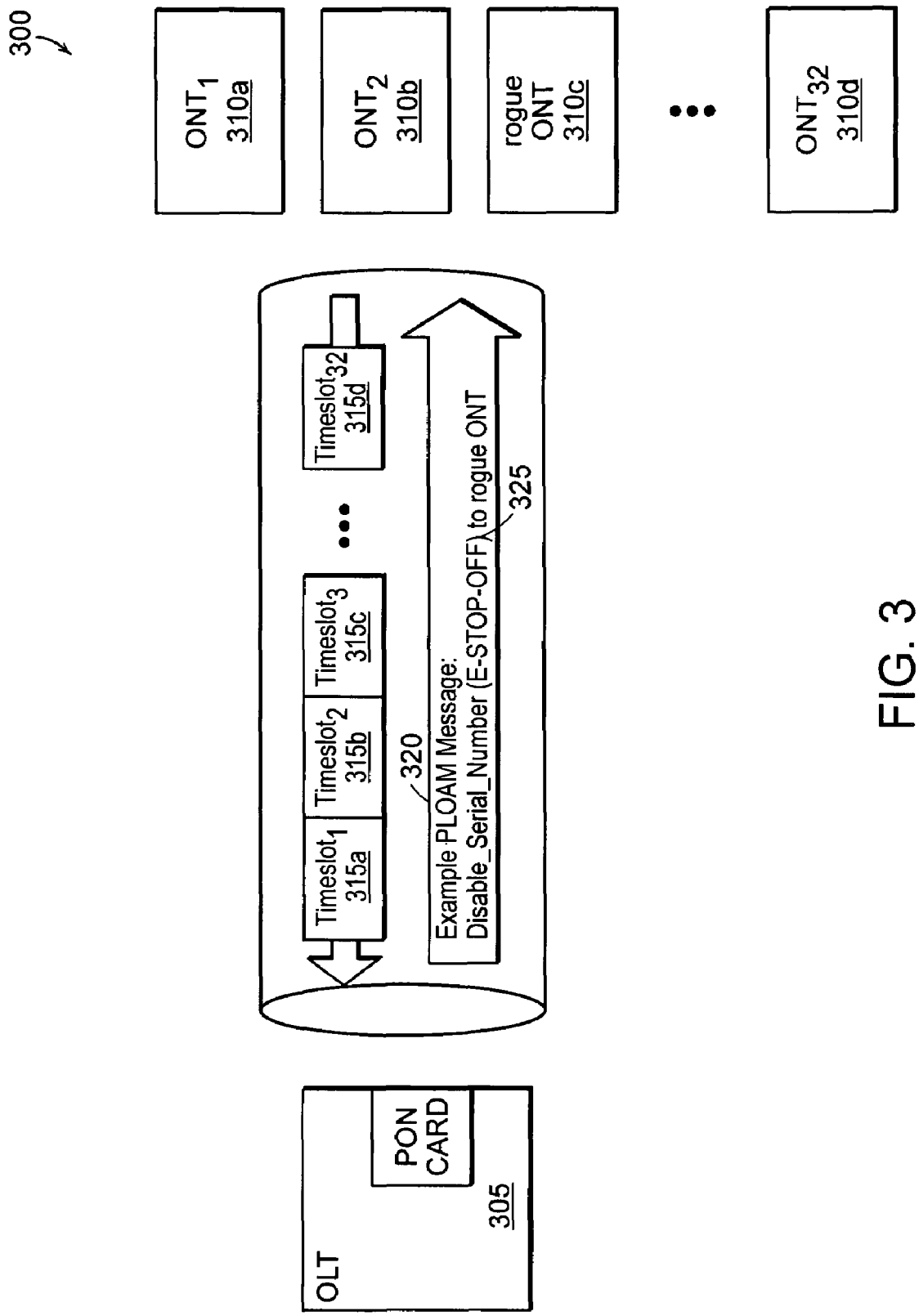
FIG. 3 is a block diagram of an exemplary system supporting a PON card causing an ONT card to enter or maintain an E-STOP state in accordance with one embodiment of the present invention.

Referring to FIG. 3, a system 300 may support an OLT/PON card 305 which causes an ONT card (310a-310d) to enter or maintain an E-STOP state. Each ONT card (310a-310d) may be allocated a timeslot (315a-315d) to communicate data (not shown). For example, an $ONT_1$ card 310a may allocate a $timeslot_1$ 315a to communicate data. Consequently, the $ONT_1$ card 310a does not communicate data in a timeslot allocated to another ONT card, e.g., a $timeslot_2$ 315b.

As previously defined, a rogue ONT card 310c may misbehave by communicating data while another ONT card is communicating data. That is, the rogue ONT card 310c uses a timeslot other than the timeslot allocated to it. For example, in FIG. 3, the rogue ONT card 310c is allocated $timeslot_3$ 315c to communicate data. The rogue ONT card 310c, however, instead of using $timeslot_3$ 315c, also uses $timeslot_1$, $timeslot_2$, and so forth (315a, 315b and 315d, respectively).

The OLT/PON card 305 in response to the rogue ONT card 315c sends a PLOAM message 320 which may include an E-STOP-ON state indicator 325 to the rogue ONT card 315c. Moreover, as previously described, there may be several instances when the ONT/PON card 305 sends the PLOAM message 320 with an E-STOP state indicator. For example, when the OLT/PON card 305 ranges the ONT card (e.g., 310a), the OLT/PON card 305 may send the PLOAM message 320 with the E-STOP state indicator, thereby maintaining an E-STOP state of the ONT 310a.

While this invention has been particularly shown and described with references to preferred embodiments thereof, it will be understood by those skilled in the art that various changes in form and details may be made therein without departing from the scope of the invention encompassed by the appended claims.

For example, as described above, a PLOAM message may be one which is defined in G.983.1. Isolating or troubleshooting a rogue ONT card may be performed through the use of a PLOAM message or other type of message or command signal in the same or other networks. Isolating the rogue ONT card may be performed, for example, by either (i) disabling all ONTs and then re-enabling each ONT card one at a time to determine which ONT card caused the problems associated with the ONT card to present itself or (ii) disabling each ONT card one at a time.

In some embodiments, an E-STOP-OFF or an E-STOP-ON message or command may be implemented by changing a state of one bit in the PLOAM message. In other embodiments, other messages or command techniques well known in any field of networking may be employed.

In cases where an ONT card has an activation mode, a PON card may use special commands, sequences, or states to cause the ONT card to enter or maintain an upstream communications state supported by the ONT activation mode. The PON card may also send the Disable_serial_number message associated with the E-STOP state as part of ONT ranging regardless of whether the ONT activation mode is enabled or disabled.

Although described as "cards" herein, it should be understood that PON cards, OLT cards, or ONT cards may be systems or subsystems without departing from the principles disclosed hereinabove.

It should also be understood that the terms "message" and "command" are used interchangeably herein to refer generally to mechanisms for causing a change in state.

Other embodiments, such as those disclosed in U.S. Provisional Application No. 60/623,423 filed on Oct. 28, 2004, entitled "Rogue ONT," may also be employed alone or in combination with the teachings hereinabove.

What is claimed is:

1. A method of controlling a behavior of an element in a passive optical network (PON) comprising:
   issuing a message from a first PON element to a second PON element to cause the second PON element to enter or maintain a state of upstream communications (a) expected by the first PON element and (b) independent of (i) a state of upstream communications maintained by the second PON element at a time the second PON element receives the message and (ii) an ability of the second PON element to respond to ranging grants, the message being issued dependent on the state of upstream communications of the second PON element as expected by the first PON element and the state of upstream communications being an enabled state or a disabled state;
   ranging the second PON element by the first PON element if the state of upstream communications of the second PON element is in the enabled state; and
   bypassing the ranging of the second PON element if the state of upstream communications of the second PON element is in the disabled state.

2. The method according to claim 1 further comprising detecting at least one second PON element which is disrupting the upstream communications of at least one other second PON element.

3. The method according to claim 2 wherein detecting comprising:
   causing at least one of the multiple of second PON elements to enter into the disabled state of the state of upstream communications; and
   causing at least one of the multiple of second PON elements to enter into the enabled state of the state of upstream communications.

4. The method according to claim 2 wherein detecting comprising
   causing the multiple of second PON elements to enter into the disabled state of the state of upstream communications; and
   causing at least one of the multiple of second PON elements to enter into the enabled state of the state of upstream communications.

5. The method according to claim 1 further comprising maintaining the state of upstream communications of the second PON element as expected by the first PON element at a time other than when the first PON element ranges the second PON element.

6. The method according to claim 5 further comprising causing the state of upstream communications of at least one second PON element to enter into the disabled state when upstream communications are disrupted.

7. The method according to claim 1 wherein the message is a Physical Layer Operations, Administration and Maintenance (PLOAM) message.

8. The method according to claim 1 wherein the state of upstream communications of the second PON element as expected by the first PON element is stored in a database in communication with the first PON element.

9. The method according to claim 1 wherein the second PON element disables its transmitter when the state of upstream communications of the second PON element is in the disabled state.

10. The method according to claim 1 wherein the first PON element issues the message to a plurality of second PON elements at substantially the same time.

11. The method according to claim 1 wherein the first PON element issues the message when the second PON element is provisioned with an ability to have the state of upstream communications enabled or disabled.

12. The method according to claim 1 wherein the first PON element issues the message at substantially the same time as ranging the second PON element.

13. A method of claim 1 further comprising maintaining the state of upstream communications of the second PON element as expected by first PON element as long as a valid serial number is provisioned for the second PON element.

14. The method according to claim 1 further comprising:
   at the first PON element, determining an expectation of whether the second PON element is to be in either an enabled or disabled state of upstream communications based on a provisioned state of upstream communication of the second PON element stored in a database in communication with the first PON element;
   in an event the expectation is that the state of upstream communications of the second PON element is disabled, sending a Physical Layer Operations, Administration and Maintenance (PLOAM) message with an B-STOP-OFF indication to the second PON element to enable upstream communications; and
   in an event the expectation is that the state of upstream communications of the second PON element is enabled, sending a PLOAM message with an B-STOP-ON indication to the second PON element to disable upstream communications.

15. A passive optical network (PON) system comprising:
   a first PON element;
   at least one second PON element optically coupled to the first PON element, the first PON element being configured, at each occurrence of ranging the at least one second PON element, (i) to issue a message to the at least one second PON element to cause the at least one second PON element to enter or maintain a state of upstream communications (a) expected by the first PON element and (b) independent of (1) a state of upstream communications maintained by the second PON element at a time the second PON element receives the message and (2) an ability of the second PON element to respond to ranging grants, the message being issued dependent on the state of upstream communications of the second PON element as expected by the first PON element and (ii) to range the at least one PON element after issuing the message to the at least one PON element.

16. The PON system according to claim 15 wherein the first PON element detects at least one second PON element which is disrupting the upstream communications of at least one other second PON elements.

17. The PON system according to claim 16 wherein the first PON element (i) causes at least one second PON element to enter a disabled state of upstream communications and (ii) causes at least one other second PON element to enter an enabled state of upstream communications.

18. The PON system according to claim 16 wherein the first PON element (i) causes a plurality of second PON elements to enter a disabled state of upstream communications and (ii) causes at least one of the plurality of second PON elements to enter an enabled state of upstream communications.

19. The PON system according to claim 15 wherein the first PON element maintains the state of upstream communications of the second PON element as expected by the first PON element at a time other than when the first PON element ranges the second PON element.

20. The PON system according to claim 19 wherein the first PON element causes at least one second PON element to enter a disabled state of upstream communications while upstream communications are disrupted.

21. The PON system according to claim 15 wherein the message is a Physical Layer Operations, Administration and Maintenance (PLOAM) message.

22. The PON system according to claim 15 wherein the state of upstream communications of the second PON element as expected by the first PON element is stored in a database in communication with the first PON element.

23. The PON system according to claim 15 wherein the second PON element disables its transmitter when it enters a disabled state of upstream communications.

24. The PON system according to claim 15 wherein the first PON element issues the message to a plurality of second PON elements at substantially the same time.

25. The PON system according to claim 15 wherein the first PON element issues the message when the second PON element is provisioned with an ability to have the state of upstream communications.

26. The PON system according to claim 15 wherein the first PON element issues the message at substantially the same time that it ranges the second PON element.

27. A method of controlling a behavior of an element in a passive optical network (PON) comprising:
 at each occurrence of ranging, issuing a message from a first PON element to a second PON element to cause the second PON element to enter or maintain an enabled state of upstream communications (a) expected by the first PON element and (b) independent of (i) a state of upstream communications maintained by the second PON element at a time the second PON element receives the message and (ii) an ability of the second PON element to respond to ranging grants, the message being issued dependent on the state of upstream communications of the second PON element as expected by the first PON element; and
 ranging the second PON element by the first PON element.

28. A method of controlling a behavior of an element in a passive optical network (PON) comprising issuing a message from a first PON element to a second PON element to cause the second PON element to enter or maintain a state of upstream communications (a) expected by the first PON element and (b) independent of (i) a state of upstream communications maintained by the second PON element at a time the second PON element receives the message and (ii) an ability of the second PON element to respond to ranging grants, the message being issued dependent on the state of upstream communications of the second PON element as maintained by the first PON element and the state of upstream communications being an enabled state or a disabled state.

* * * * *

UNITED STATES PATENT AND TRADEMARK OFFICE
CERTIFICATE OF CORRECTION

| | |
|---|---|
| PATENT NO. | : 7,391,972 B1 |
| APPLICATION NO. | : 11/265492 |
| DATED | : June 24, 2008 |
| INVENTOR(S) | : Marc R. Bernard, Alexander S. Millard and Subbarao Nalajala |

Page 1 of 1

It is certified that error appears in the above-identified patent and that said Letters Patent is hereby corrected as shown below:

In column 8, line 31, delete "B-STOP-OFF" and insert --E-STOP-OFF--.

In column 8, line 36, delete "B-STOP-OFF" and insert --E STOP-OFF--.

Signed and Sealed this

Sixteenth Day of September, 2008

JON W. DUDAS
*Director of the United States Patent and Trademark Office*